Oct. 2, 1962 L. T. KNOCKE 3,056,443
THREADED FASTENER HAVING A RESILIENT LOCKING FLANGE
Filed July 17, 1961 2 Sheets-Sheet 1
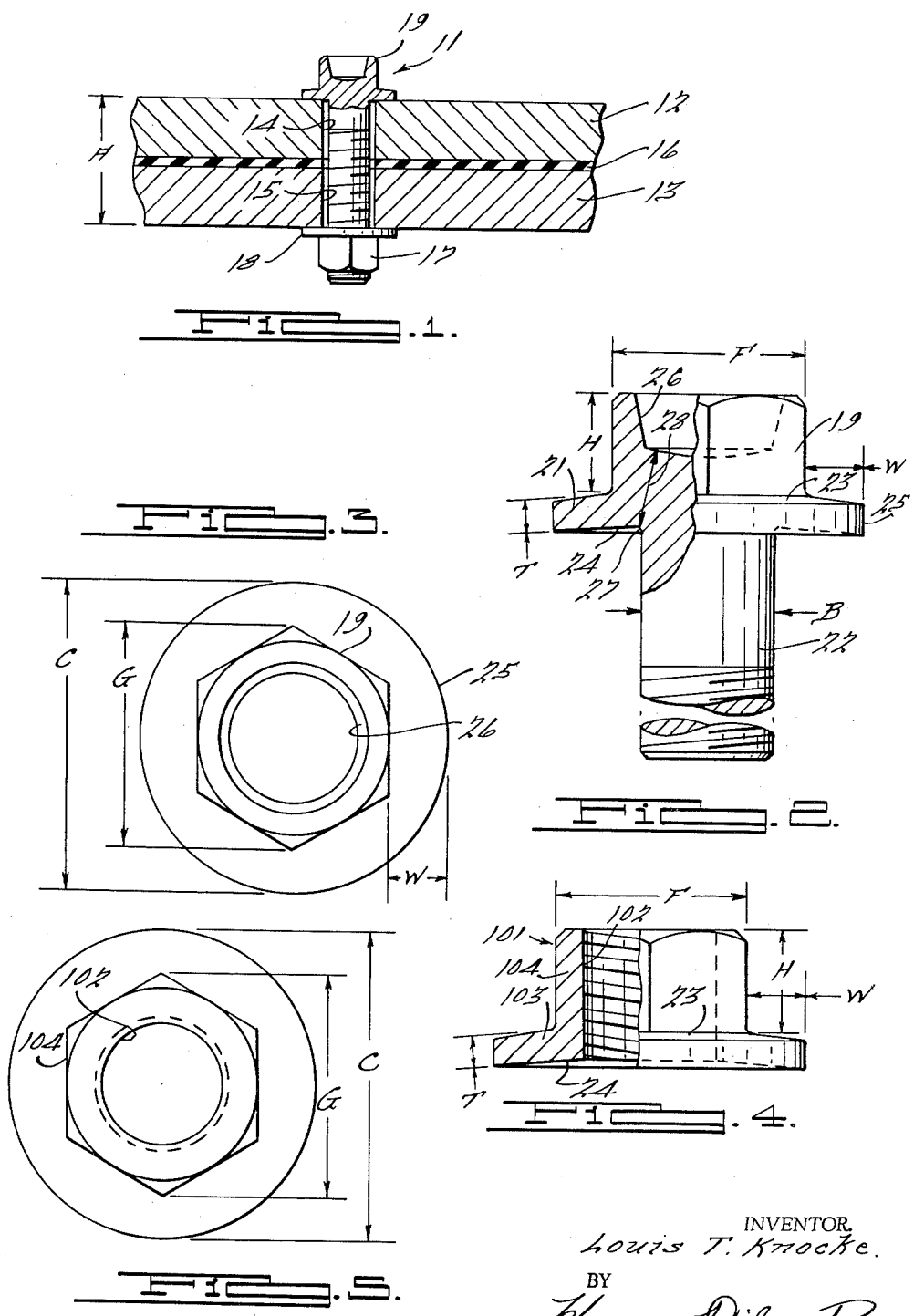
INVENTOR.
Louis T. Knocke.

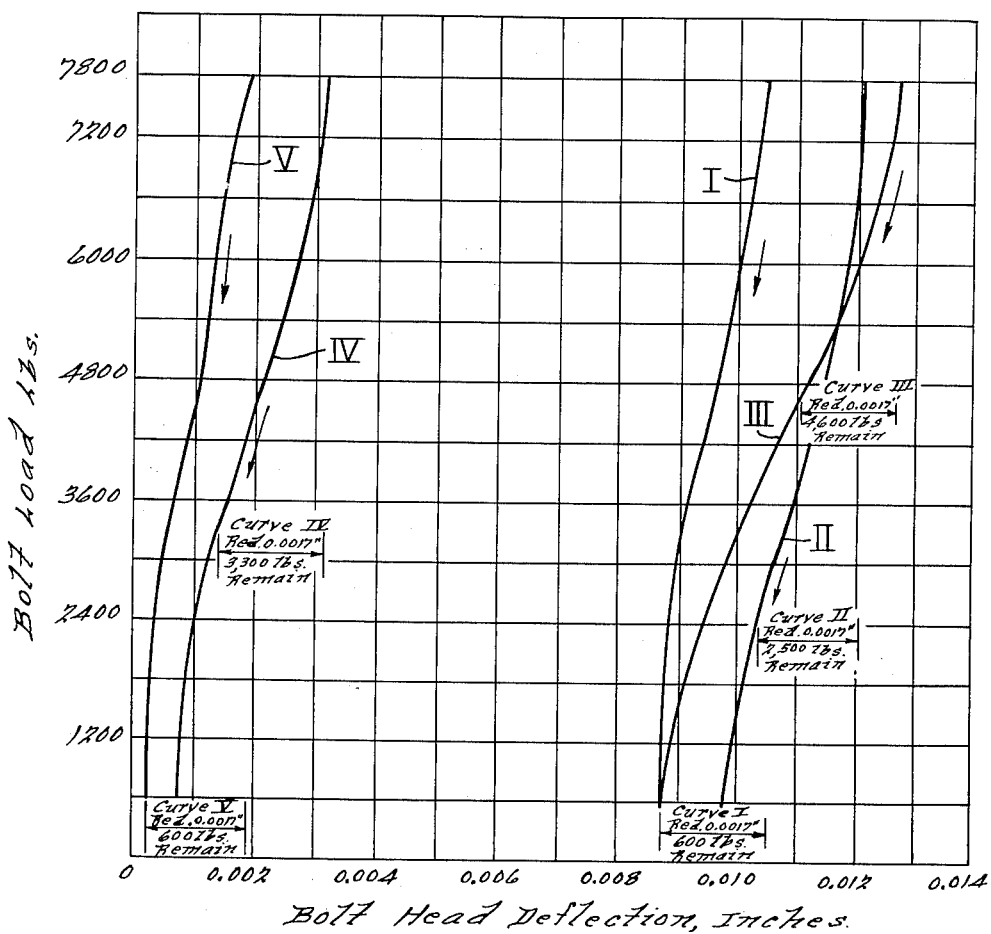

3,056,443
THREADED FASTENER HAVING A RESILIENT LOCKING FLANGE
Louis T. Knocke, 5578 Putnam, Birmingham, Mich.
Filed July 17, 1961, Ser. No. 124,551
4 Claims. (Cl. 151—38)

This invention relates to threaded fasteners, and more particularly to nuts and bolts having means for maintaining a high degree of gripping strength upon a loss of grip thickness of the fastened parts. This application is a continuation-in-part of application Serial No. 704,821, filed December 23, 1957, and now abandoned.

It is an object of the invention to provide a novel and improved threaded fastener especially adapted for use where substantial loads are required, and which will insure that a relatively high percentage of the load originally applied to the fastener will still be present upon a reduction of grip thickness, thereby reducing the possibility of looseness or leakage between the parts, as well as of fatigue failure of the fastener due to repeated stresses.

It is another object to provide an improved fastener of the above nature which will not tend to embed itself into the surface which it engages, thus further reducing the possibility of a loss in fastener load.

It is a further object to provide an improved fastener having the above characteristics, which is especially adapted for manufacture by a cold heading process, greatly reducing the cost of manufacture on a mass production basis as compared with fasteners requiring more expensive manufacturing methods.

It is also an object to provide an improved threaded fastener of this nature in which the fastener head is made in conformity with accepted engineering standards, the fastener thus being usable with conventional fastener tools.

Other objects and advantages of the present invention will become apparent from the following detailed description taken in conjunction with the accompanying drawings, wherein:

FIGURE 1 is a cross-sectional view in elevation of two parts held together by a fastener incorporating the principles of the invention;

FIGURE 2 is a partly sectioned elevational view of a bolt made according to the invention;

FIGURE 3 is a top plan view of the bolt;

FIGURE 4 is a modified form of the invention in the form of a nut;

FIGURE 5 is a top plan view of the nut; and

FIGURE 6 is a chart of test results comparing the invention with other fasteners and showing the manner in which a substantial portion of the original fastener load is maintained upon a reduction of grip thickness.

In general terms, the invention as illustrated comprises a threaded fastener which may take the form of a nut or a bolt with a polygonally shaped head of standard basic external dimensions corresponding to the nominal size or basic major thread diameter. A flange is formed integrally with the head on the side thereof facing the work. Both surfaces of this flange slope slightly in a direction away from the head at an angle of between 2° and 8°, preferably about 5°. The flange diameter is between 1.66 and 3.0 times the nominal thread diameter. The thickness of the flange is between 0.1 and 0.33 times the nominal thread diameter.

Referring more particularly to the drawings, the bolt form of the invention is generally indicated at 11 in FIGURE 1 and is shown as applied to a pair of workpieces 12 and 13 which have alinged apertures 14 and 15 respectively for receiving bolt 11 and are separated by a gasket 16. A conventional nut 17 and washer 18 are mounted on the underside of the assembly.

The distance A may be termed the grip thickness of the assembled parts. Normally, a bolt holding the parts together is tightened until it reaches substantially its proof load, that is, the load assigned by engineering standards as that which a bolt of specified dimensions and material is capable of assuming without permanent deflection. For example, the 1959 SAE Handbook, page 129, Table 2, lists the proof load of a grade No. 5 (material) bolt of ⅜ inch diameter as 6,600 pounds for a coarse threaded bolt and 7,450 pounds for a fine threaded bolt. The matching nuts are assigned a minimum tensile strength and proof load of 9,300 and 10,550 pounds respectively.

Normally, grip thickness A will be decreased in time due to such factors as permanent gasket compression, embedding of bolt 11 or washer 18 into the work, the yielding of foreign particles, thread surfaces or surface irregularities between the fastener and work, or the cold flow of assembly members.

This reduction in grip thickness will cause a reduction in elongation of bolt 11, and thus a reduction in the remaining bolt load, that is, the force holding parts 12 and 13 together. This will increase the chances for leakage past gasket 16 and for relative shifting of parts 12 and 13. Moreover, if parts 12 and 13 are subjected to repeated separating forces of a magnitude greater than the force holding them together, such as might occur for example between a cylinder head and cylinder, repeated stressing of the bolt will ensue with the possibility of fatigue failure.

According to the invention, means are incorporated in bolt 11, or in a nut to be used with a conventional bolt, which cause a relatively high proportion of the fastener load to be retained upon a given reduction in grip thickness, as compared with the load which would be retained with an ordinary fastener assembly. Bolt 11 may have a head 19 with basic external dimensions corresponding to the standard dimensions assigned to a bolt having that nominal thread diameter, so that it may be readily engaged by standard socket wrenches or other tools. Such standards are used almost universally in United States engineering practice and are prepared by such organizations as the American Standards Association and the Society of Automotive Engineers. For example, the 1959 SAE Handbook, page 374, Table 2, gives the following dimensions, conforming with ASA standards, for regular hexagon bolts of ⅜ inch nominal thread size (indicated at B in FIGURE 2):

Width across flats (F): maximum (basic) 9/16 inch or 0.5625"; minimum 0.544".

Width across corners (G): maximum 0.650"; minimum 0.620".

Height (H): nominal ¼ inch; maximum 0.268"; minimum 0.226".

The distance across flats is normally about 1.5 times the nominal thread size.

A flange 21 is formed between head 19 and shank 22 of bolt 11, the flange being integral with both the head and shank. Flange 21 has an upper surface 23 facing head 19, and a lower surface 24 facing shank 22, together with an outer surface 25 of cylindrical shape connecting surfaces 23 and 24.

Both surfaces 23 and 24 slope slightly toward bolt shank 22, these surfaces being substantially frustoconical in the illustrated embodiment of the invention. The slope of surface 24 is between 3° and 8° from a plane transverse to the bolt axis, and is preferably about 5°. The slope of surface 23 is at least equal to or is greater than the slope of surface 24. Surface 23 extends continuously from the outside of bolt head 19 to outer edge 25 of flange 21, while surface 24 extends continuously from substantially the nominal bolt diameter to outer edge 25. The outer diameter of flange 21 (indicated at C in FIGURE 3) is between 1.66 and 3.0 times the nominal thread size B.

It has been found that the ratio between the flange thickness and the nominal thread size B is critical in achieving the desired maintenance of load in the fastener. The flange thickness is indicated at T in FIGURE 2 and may be regarded as the average thickness of the flange; in the illustrated embodiment, this would be the thickness at the midpoint of free flange width, that is, at the midpoint of distance W, measured on a line normal to lower flange surface 24.

In order to achieve the objects of the invention, it has been found that the ratio $T/B$ must be between about 0.1 and 0.33.

A flared circular recess 26 is formed in the top of head 19 in order to facilitate manufacture of bolt 11 by a cold heading process and to contribute to the elasticity of the unit. To achieve optimum elasticity, the ratio of the shear area between recess 26 and juncture 27 of flange 21 with shank 22 to the cross-sectional area of shank 22 must be within certain limits. The shear area may be defined as the area of a surface generated by rotating a line indicated at 28 of minimum length and extending between recess 26 and juncture 27 about the bolt axis. The ratio of this area to the cross-sectional area of shank 22 is preferably between 1.1 and 3.2.

In all cases, the proportions should be such that upon tightening of the bolt to approximately its assigned elastic proof load, undersurface 24 will have been sufficiently flattened against the workpiece so that embedding of the fastener in the work will be minimized. Upon reduction of grip thickness A, flange 21 will tend to return toward its original unstressed shape, and in doing so will maintain to a substantial extent the load in the bolt shank and therefore the force tending to hold parts 12 and 13 together.

FIGURE 6 illustrates graphically the advantages of a bolt constructed in accordance with the principles of the invention. This chart has as its abscissa bolt head deflection in inches, and as the ordinate the bolt load in pounds. Five curves are shown on the chart, each curve showing the load-versus-deflection curve during unloading of a bolt previously loaded to 7,800 pounds. The unloading portion of the curve is the critical portion, since it represents the action of the bolt upon a reduction in grip thickness of the parts. All five bolts were ⅜ inch nominal thread diameter, 16 threads per inch, 2⅝ inches long. The bolts were made of 1038 steel (SAE Grade No. 5), Rockwell-C hardness 31 to 36. Metals having other properties could of course be used within the principles of the invention.

All five bolts were made as shown generally in FIGURES 2 and 3, with a head 19 having a dimension F of 0.5625", a dimension G of 0.65", and a dimension H of ¼ inch. Flange 21 had an outer diameter C of 0.875 inch, and since dimension B was 0.375 inch, the ratio $C/B$ was 2.3. The angle of inclination of undersurface 24 was 5°, the bolt being supported thereby for tensile loading.

The only dimension varied in the five samples was the dimension T. Each bolt was loaded to 7,800 pounds and the load then reduced. The following tabulation shows the load remaining in each bolt when the bolt head deflection had returned 0.0017" from its maximum deflection (equivalent to a reduction in grip thickness of 0.0017"):

| Curve No. | T, inches | T/B | Remaining Load upon 0.0017" Reduction in Grip Thickness, lbs. |
|---|---|---|---|
| I | 0.027 | 0.072 | 600 |
| II | 0.047 | 0.125 | 2,500 |
| III | 0.067 | 0.178 | 4,600 |
| IV | 0.117 | 0.312 | 3,300 |
| V | 0.132 | 0.352 | 600 |

These figures demonstrate graphically the very high load-retentive properties of a bolt made in accordance with the principles of the invention, that is, with a ratio $T/B$ between about 0.1 and 0.33. For example, the load retained when $T/B$ equaled 0.125 was over 400% greater than when $T/B$ equaled 0.072, and when $T/B$ equaled 0.312 the retained load was five and one-half times greater than when $T/B$ equaled 0.352.

FIGURES 4 and 5 illustrate a nut, generally indicated at 101, made in accordance with the invention. Except for the fact that nut 101 has a threaded bore 102 instead of a shank and a head recess, the relative proportions of the parts will be the same as in the case of the bolt. More particularly, a flange 103 is formed integrally with the nut head 104, and the critical ratio ranges of the flange and external nut head dimensions will be the same as those described with respect to the bolt. For this reason, nut 101 is provided with reference numerals and letters identical with those used in FIGURES 2 and 3 for the corresponding parts.

While it will be apparent that the preferred embodiments herein illustrated are well calculated to fulfill the objects above stated, it will be appreciated that the invention is susceptible to modification, variation and change without departing from the proper scope or fair meaning of the subjoined claims.

What is claimed is:

1. In a threaded fastener comprising a headed member having a major thread diameter and a head with minimum external width dimensions larger than said thread diameter, a flange formed integrally with said head, a first surface on the side of said flange facing away from said head extending from the major thread diameter to the outer flange diameter, and a second surface on the side of said flange facing said head and extending from the outer periphery of said head to the outer flange diameter, said surfaces being inclined in the same direction with substantially equal slopes away from said head, the head extending axially from said flange and having a tool-engageable surface, the outer diameter of said flange being between 1.66 and 3.0 times said major thread diameter, the ratio of average flange thickness to major fastener thread diameter being between about 0.1 and 0.33.

2. In a threaded fastener comprising a headed member having a predetermined major thread diameter and minimum external head width dimensions about 1.5 times larger than said thread diameter, a flange formed integrally with said head at one end thereof and extending outwardly therefrom, the surface of said flange facing away from said head extending from said major thread diameter to the outer flange diameter, the surface of said flange facing said head extending from the external head surface to the outer flange diameter, said head extending axially from said flange and having a tool-engageable surface, said outer flange diameter being between 1.66 and 3.0 times said major diameter, the ratio of average flange thickness to major fastener thread diameter being between about 0.1 and 0.33, said flange surfaces being inclined in the same direction with substantially equal slopes outwardly and away from said head at an angle of between 3° and 8°.

3. In a threaded bolt comprising a headed member having a shank with a predetermined major thread diameter, a head having external width larger than said major thread diameter, a flange formed integrally with said head, a first surface on the side of said flange facing away from said head extending from the major thread diameter to the outer flange diameter, and a second surface on the side of said flange facing said head and extending from the outer periphery of said said head to the outer flange diameter, said surfaces being inclined in the same direction with substantially equal slopes away from said head, the head extending axially from said flange and having a tool-engageable surface, the outer diameter of said flange being between 1.66 and 3.0 times said major thread diameter, the ratio of average flange thickness to major fastener thread diameter being between about 0.1 and 0.33.

4. The combination according to claim 3, further provided with a circular recess centrally located in the outer end of said head, the minimum annular shear area of metal measured between said recess and the juncture of said flange with the bolt shank being greater than the cross-sectional area of said shank.

References Cited in the file of this patent

UNITED STATES PATENTS

| | | |
|---|---|---|
| 1,229,911 | Dodds | June 12, 1915 |
| 2,734,547 | Hotchkin | Feb. 14, 1956 |
| 2,897,867 | La Torre | Aug. 4, 1959 |

FOREIGN PATENTS

| | | |
|---|---|---|
| 276,786 | Great Britain | Sept. 8, 1927 |
| 449,912 | Canada | July 20, 1948 |